United States Patent [19]

Gluck et al.

[11] 4,007,556

[45] Feb. 15, 1977

[54] FOAM BODY AND PROCESS FOR THE PRODUCTION THEREOF

[75] Inventors: Maternus Glück, Leonding-Doppel; Walter Kriegner; Bernhard Eder, both of Linz, all of Austria

[73] Assignee: Semperit Aktiengesellschaft, Vienna, Austria

[22] Filed: May 14, 1973

[21] Appl. No.: 360,321

Related U.S. Application Data

[63] Continuation of Ser. No. 184,406, Sept. 28, 1971, abandoned.

[30] Foreign Application Priority Data

Oct. 1, 1970 Austria .............................. 8859/70

[52] U.S. Cl. ..................................... 47/56; 47/77; 47/DIG. 7
[51] Int. Cl.² ........................................ A01C 1/04
[58] Field of Search ................ 47/37, DIG. 7, 56, 9

[56] References Cited

UNITED STATES PATENTS

| | | | |
|---|---|---|---|
| 2,965,584 | 12/1960 | Elkin | 47/DIG. 7 |
| 2,988,441 | 6/1961 | Pruitt | 47/DIG. 7 |
| 3,110,129 | 11/1963 | Baumann | 47/DIG. 7 |
| 3,154,884 | 11/1964 | Amar et al. | 47/DIG. 7 |
| 3,257,754 | 6/1966 | Ohsol | 47/56 |
| 3,336,129 | 8/1967 | Herrett et al. | 47/9 X |
| 3,608,238 | 9/1971 | Reuter | 47/DIG. 7 |

FOREIGN PATENTS OR APPLICATIONS 722,589  11/1965  Canada

*Primary Examiner* — Robert E. Bagwill
*Attorney, Agent, or Firm* — Ernest F. Marmorek

[57] ABSTRACT

A foam body, for example in the form of a mat, strip, square or the like, consisting of pieces of polyurethane foam held together by a bonding agent, which may be foamed, e.g. porous polyurethane, characterized in that plant seeds are contained in the foam body.

1 Claim, 1 Drawing Figure

U.S. Patent  Feb. 15, 1977  4,007,556
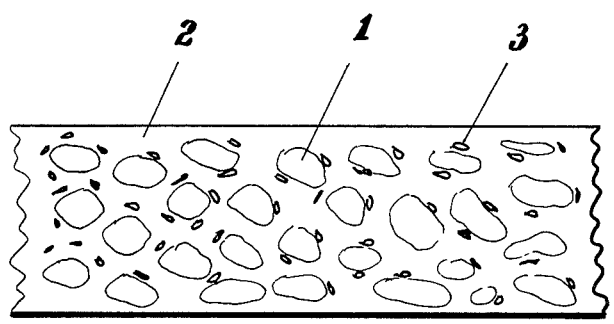
INVENTORS:
MATERNUS GLUCK,
WALTER KRIEGNER
and BERNHARD EDER
BY

FOAM BODY AND PROCESS FOR THE PRODUCTION THEREOF

This is a continuation of application Ser. No. 184,406, filed Sept. 28, 1971 (now abandoned).

BACKGROUND OF THE INVENTION

The present invention relates to a foam body, such as, for example, a mat, strip, square or the like, consisting of pieces of polyurethane foam, held together by a bonding agent which may be foamed, for example, porous polyurethane, and to a process for the production of such bodies.

The object of the present invention may be seen in the fact that a sprouting, e.g. of flowers, grasses, vegetables or the like, can be obtained which is as rapid as possible and, at the same time, economical.

It is already known to cultivate turf on a suitable base, e.g. gravel, and to cut this turf into slabs, these slabs being thereafter placed at the spots to be cultivated. These turf slabs or bricks require approximately 2 years for their production. A turf cannot be withdrawn from its base until the roots have formed such a solid and uniform texture that the turf bricks do not break up. Thus a turf producer must have a large area at his disposal since the production process of growth, necessitates 2 years.

Furthermore, it is known to arrange a mixture of liquid ureaformaldehyde foam and plant seeds on a base. A urea foam possesses a hard and brittle structure which is destroyed even by slight mechanical stresses. Moreover, a urea-formaldehyde foam is subject to a very rapid decomposition in nature, so that this foam can only act at the beginning of the germination of the plant seeds. Thus, it serves to withstand water during germination and protects from birds. In no case can a foam of this kind be transported when planted, since the foam would be subject to destruction as a result of its low mechanical stability.

SUMMARY OF THE INVENTION

The invention relates to a foam body consisting of pieces of polyurethane foam held together by a possibly foamed bonding agent, e.g. porous polyurethane, and essentially consists in the fact that there are plant seeds form being eaten by birds, but also permits the transportation of the plants which have grown from the seeds to be effected rapidly and easily, since the cohesion of the plants with one another is not only provided by the roots thereof but is ensured by the foam body. It is essential that the pieces of foam should consist of polyurethane, since the latter possesses very good mechanical properties. Both soft polyurethane foam and hard polyurethane foam can be used. It is not absolutely necessary that the bonding agent for the foam pieces should itself possess very good mechanical properties, since the cohesion of the foam pieces is to a certain extent already provided by a slight through-rooting. The roots of plants indeed do not grow only in one direction, but grow in every direction in the substrate, so that an additional connection of the foam pieces is ensured by the roots. The foam bodies in accordance with the invention render it possible, for example, to market a turf in roll form for which the cultivation time is no longer determined by strong root growth through the substrate, but rather depends upon the growth of those parts of the plant which are above ground. It is therefore possible to bring a turf on to the market after a period as short as 3 months. This is a considerable advantage when it is remember that 2 years are required before a normal turf can be transported.

In wet regions or in plant cultivation in which the water supply takes place from above, the seeds arranged in the upper part of the body will tend to germinate more rapidly than those arranged in the lower part. If, on the other hand, the cultivation of the plants takes place in such a manner that the water supply is provided from below, the plant seeds which are arranged in the lower part will tend to germinate first. If it is desired to cultivate plants in an area in which the water supply is provided on some occasions from above and on others from below (for example in wet regions with clayey soil or the like) and with intensive sunshine, then, when the plant seeds are distributed approximately uniformly over the entire cross-section of the foam body, one is not compelled to take note of where the water supply is taking place, and in all cases, there is an early germination of the plant seeds.

It has proved to be particularly advantageous if the density of the foam body is from approximately 60 kg/m$^3$ to approximately 250 kg/m$^3$, preferably from approximately 90 kg/m$^3$ to approximately 120 kg/m$^3$. With such densities, the mechanical properties and also the water resistance are favourable. If the density is considerably below 60 kg/m$^3$ the foam material will have too large a surface, so that the evaporation of humidity is too quick. Furthermore the strength of such a foam material is often too low to withstand a harsh manual handling.

Having a density above 250 Kg/m$^3$, the foam body will have such a high mechanical strength, that the rooting is slowed down whereby the growth of the plants is reduced.

Preferably, the foam body possesses from approximately 2 kg to approximately 7 kg of grass seeds for each 100 m$^2$ area which is to be covered. Through this amount of grass seed per area unit, an economical and yet rapid sprouting of the foam body is obtained.

In order to achieve a high water adsorptivity, a hydrophilic substance may be added to the foam body such as pellets or granules of hydrophilic foam, a hydrophilic binding agent between the foam pieces and/or cellulose fibres or powder, infusorial earth, chalk or the like. It is especially advantageous to apply a hydrophilic binding agent when using common foam for pellets.

A particularly favourable situation, with respect to aeration and watering is obtained if the thickness of the foam body is from approximately 0.5 cm to approximately 2.0 cm, preferably approximately 0.8 cm to approximately 1.2 cm.

This choice has also been made with regard to the desired handling strength and rooting capacity of such plates or mats.

The process, in accordance with the invention, for the production of such a foam body consists in that a mixture of pieces of polyurethane foam and grass seeds with a bonding agent which may be foamable, is mixed and moulded. It is thereby ensured in a particularly simple and easy way that the seed is not provided over the entire surface with a continuous layer of the bonding agent, as a result of which a particularly rapid and easy germination of the seed is made possible.

The invention is explained in detail below with reference to exemplary embodiments.

Seed growing bodies with a density of 90 kg/m³.

773 kg of pieces of soft polyurethane foam with a diameter of approximately 10 mm, and a density of approximately 30 kg/m³ are mixed with grass seeds. The final density of the body is from approximately 60 kg/m³ to approximately 250 kg/m³, preferably from approximately 90 kg/m³ to approximately 120 kg/m³. The quantity of the grass seeds if dependent upon the thickness of the slabs which are to be cut. Between 2 and 7 kg of grass seeds should drop on about 100 m² of foam body surface which is to be sprouted. This mixture is mixed in a mixer with a mixture of toluylene-diisocyanate and a polyether with terminal OH groups in a stoichiometric ratio. This mixture is then moulded in a mould for 20 – 30 minutes, under pressure and possibly under the action of heat e.g. of steam. The foam body is then cut into slabs of 10 mm thickness. The following grass seeds and quantities per 100 m² were used:

(V1)

90 % Festuca rubra "Biljart"
10% Agrostis tennis "Tracenta"
3.50 kg/100 m²

(V2)

100 % Agrostis stoloinfera "Penncross"
2.25 kg/100 m²

(V3)

80 % Festuca rubra "Golfrood"
20 % Argostis stoloinfera "Penncross"
6.00 kg/100 m²

(V4)

70 % Festuca rubra "Goldfrood"
30 % Poa pratensis "Newport"
6.60 kg/100 m²

(V5)

50 % Poa pratensis "Newport"
50 % Poa pratensis "Merion"
5.40 kg/100 m²

(V6)

70 % Lolium L. spp (Eng. Raygras)
10 % Festuca rubra (Rotschwingel)
8 % Poa prantensis (Wiesenrispe)
7 % Festuca ovina (Schafschwingel)
5 % Poa nemoralis (Hainriope)
6.00 kg/100 m²

The foam bodies are laid on milled, levelled and rolled ground. The foam body was secured to the earth by means of pins. This securing is necessary only for approximately the first 3 weeks, since after this period of time, the roots of the plants have penetrated into the subsoil. In a regular watering of the foam bodies, all the grass seeds germinated at the right time. If one only wishes to carry out a slight watering, it is also possible to apply a layer of sand to the foam bodies which have already been laid out, as a result of which a further securing of the foam body to the subsoil is simultaneously attained. If an ester polyurethane is used instead of the ether polyurethane, the water-retaining capacity of the foam body is particularly great.

After two or three months, the grass growth was such that transport could be effected.

If the foam body consists of ether polyurethane, it can be expected to rot at the earliest in 4 to 5 years, whereas, on the other hand, a foam body of ester polyurethane can be expected to rot after 2 to 3 years.

Generally speaking it was established in the experiments that the higher the density of the foam body, the greater is the water-retaining capacity.

The experiments were carried out in the most different climatic areas of Austria, and everywhere results were obtained which could be called very good.

The invention has been described in detail with reference to specific plant seeds, i.e. grass seeds, but the sphere of use of the foam body in accordance with the invention is not confined to grasses, but may also be applied in the case of other seeds. Thus, for example, a foam body according the invention in the form of a mat may be provided, that contains vegetable seeds such as of spinach, lettuce or the like. Such mats may be stored and applied to the soil at any convenient time and upon watering resulting in a quick and controlled growth of the vegetable, for instance in an emergency region after a nature catastrophe, a flower bed can be obtained by arranging seeds of flowers with different blooming times in a foam body. In order to obtain a flower bed, it is then only necessary to lay out the foam body, e.g. a strip or square on the prepared ground, whereafter it is only necessary to provide a water supply. The seeds cannot then be moved from their position either as a result of birds eating them, or by strong rainfall, or by too heavy watering. In this way, it is possible to obtain a flower bed in a particularly simple and reliable manner.

DETAILED DESCRIPTION OF THE PREFERRED EMBODIMENT

The drawing shows the specific embodiment of the inventive foam body. The thickness of the mat is ¼ inch the foam pieces 1 have a diameter between ¼ and ⅜ inch. Grass seeds 3 are positioned adjacent to the foam pieces, so that the seeds are not entirely surrounded by the foam binding agent 2.

What is claimed is:

1. Process for the manufacture of a seed growing body characterized in that a foamed binding agent is added to a mixture of polyurethane foam-pieces and seeds whereupon the resulting mixture is moulded.

* * * * *